United States Patent [19]

Haines

[11] Patent Number: 4,904,015
[45] Date of Patent: Feb. 27, 1990

[54] AIR DEFLECTION SYSTEM

[75] Inventor: Edwin L. Haines, Akron, Ohio

[73] Assignee: The Goodyear Tire & Rubber Company, Akron, Ohio

[21] Appl. No.: 230,939

[22] Filed: Aug. 11, 1988

[51] Int. Cl.[4] .............................................. B62D 35/00
[52] U.S. Cl. .................................................. 296/180.3
[58] Field of Search .................... 296/180.2, 180.3, 91; 105/2 R

[56] References Cited

U.S. PATENT DOCUMENTS

| | | | |
|---|---|---|---|
| 2,540,859 | 2/1951 | Birkin | 180/11 |
| 2,863,695 | 12/1958 | Stamm | 296/1 |
| 3,241,876 | 3/1966 | Saunders | 296/1 |
| 3,405,778 | 10/1968 | Martin | 180/24 |
| 3,711,146 | 1/1973 | Madzsar et al. | 296/15 |
| 3,945,677 | 3/1976 | Servais et al. | 296/15 |
| 4,036,519 | 7/1977 | Servais et al. | 296/15 |
| 4,102,548 | 7/1978 | Kangas | 296/1 |
| 4,142,755 | 3/1979 | Keedy | 296/91 |
| 4,156,543 | 5/1979 | Taylor et al. | 296/15 |
| 4,257,640 | 3/1981 | Wiley | 296/15 |
| 4,257,643 | 3/1981 | Choulet | 296/1 |
| 4,290,639 | 9/1981 | Herpel | 296/91 |
| 4,311,334 | 1/1942 | Jenkins | 296/91 |
| 4,343,506 | 8/1982 | Saltzman | 296/15 |
| 4,375,898 | 3/1983 | Stephens | 296/15 |
| 4,458,936 | 7/1984 | Mulholland | 296/1 |
| 4,458,937 | 7/1984 | Beckmann et al. | 296/91 |
| 4,509,786 | 4/1985 | Gregg | 296/15 |
| 4,518,188 | 5/1985 | Witten | 296/91 |
| 4,611,796 | 9/1986 | Orr | 296/15 |
| 4,611,847 | 9/1986 | Sullivan | 296/91 |
| 4,685,715 | 8/1987 | Hardin | 296/91 |
| 4,707,015 | 11/1987 | Klomfass | 296/91 |
| 4,750,772 | 6/1988 | Haegert | 296/15 |
| 4,779,915 | 10/1988 | Straight | 296/180.3 |

OTHER PUBLICATIONS

University of Maryland Wind Tunnel Report No. 85, Jun. 1953.
University of Maryland Wind Tunnel Report No. 98, Apr. 1974.
*Fleet Owner* Sep. 1987 "Aerodynamics: Shaping a Revolution", pp. 60–85.

*Primary Examiner*—Robert R. Song
*Attorney, Agent, or Firm*—Raymond J. Slattery, III

[57] ABSTRACT

A tractor (12) and trailer (14) coupled together in tandem towing relationship is provided with an air deflector system (10) attached to the tractor (12) for aerodynamically reducing the drag on such combination by enclosing the space between the cab (12a) of the tractor (12) and the trailer (14). A support means (40) is attached to the frame (42) of the tractor (12). A top air fairing (16) is movably attached to the support means (40) for extending from the top of the cab to the top of the trailer. Two side fairings (18a,18b) are movably attached to the support means (40) for extending from the rear of the cab (12a) to the trailer (14), and wherein the side fairings mate with the top fairing. A means is provided for moving the fairings (16,18a,18b) from one position to another based upon the alignment between the trailer (14) and the tractor (12).

27 Claims, 10 Drawing Sheets

AIR DEFLECTION SYSTEM

The present invention relates to an air deflection system for aerodynamically reducing the drag on a vehicle having a drive vehicle coupled together in tandem towing relationship with a trailer. More specifically this invention relates to changing the aerodynamic characteristics of a tractor-trailer combination by the use of air fairings to more aerodynamically blend the impinging air around the vehicle. Most specifically this system provides for the automatic positioning of the air deflectors in accordance with the relationship between the tractor-trailer.

Various fairings and streamlining devices have been tried to reduce the aerodynamic drag that results in a typical tractor-trailer combination. The initial devices provided an air fairing mounted upon the roof of the cab in an attempt to aerodynamically blend the top of the cab with the top of the trailer. Later, fairings were not only mounted to the cab they were also mounted to the front of the trailer, while side fairings were attached to the cab and extended to near the front of the trailer.

U.S. Pat. No. 4,142,755 for a Vehicle Drag Reducer discloses a passive air fairing system having a top and two side fairings which are attached by hinges at the cab. Each fairing extends from the cab to overlap with the trailer and is held against the trailer by springs. This type of system has several disadvantages.

First, by attaching to the cab portion of the tractor, additional loading forces are applied to the cab. The cab is generally mounted to the frame of the tractor through a spring type mounting system which provides some cushion to the occupants. The additional weight of the fairing system may result in decreased comfort to the occupants and/or additional modifications to handle the increased loading forces.

Secondly, the constant contact of the fairings with the trailer during turns results in a rubbing between the two surfaces producing the possibility of abrasion wear to the sides and top of the trailer and to the ends and sides of the fairings. This rubbing further translates into a frictional force which must be overcome in order to smoothly effect the turning of the vehicle. This increases the amount of force required and the length of time involved to turn the vehicle. This presents a safety problem to the operator where quick handling and response time are essential in an emergency or semi-emergency situation.

Thirdly, if the side fairings do not overlap sufficiently they may become caught and bent between the tractor and trailer during a turn or maneuver. For example, if the tractor is in a right hand turn the gap between the cab and the trailer becomes smaller on the right side of the vehicle while the gap on the left becomes larger. If the left side panel or fairing is not sufficiently long enough the length of the gap will exceed the length of the side panel. Since the side panels are under spring tension, the left one will be moved into the gap. As the tractor-trailer comes out of the turn to come back into alignment the gap on the left will decrease with the left panel caught or wedged between the cab and the front of the trailer. This may result in damage to the side panel and/or steering and maneuverability problems. If the panel is made sufficiently long enough to prevent this occurrence the increased length results in extra weight and torque on the hinge point and the cab.

Fourthly, if the side panels are aerodynamically designed, the lifting force on the panels or fairings is also increased. The point of attachment being at the end of the panel does not balance out these lifting forces. This then requires the usage of extremely large springs to hold the panels down or in contact with the trailer thus increasing the problems above.

Several adjustable or articulated deflection systems have been tried where a top fairing is pivotally attached to the leading edge of the roof of the cab. The trailing edge is then raised or lowered depending upon various circumstances. This is illustrated by U.S. Pat. Nos. 4,102,578; 4,375,898 and 4,458,937.

U.S. Pat. No. 4,156,543 illustrates the adjustable top fairing and additionally includes two flexible side panels which are pivotally secured to the rear of the cab by a hinge spring combination and are anchored to the side edge of the trailer by tie cords. This arrangement physically restricts the side panels to the trailer by not allowing their free movement, thus, increasing the force required to maneuver the tractor trailer. Furthermore, the top panel fails to fully enclose the top of the air space thereby increasing drag.

Other various deflection devices have been proposed in order to reduce the air draft, such as air inflated structures, U.S. Pat. Nos. 3,945,677; 4,036,519 and 4,611,847; and telescoping or bellows like structures such as U.S. Pat. Nos. 3,711,146 and 4,311,334.

All of the systems described above are passive systems inasmuch as they rely on the trailer to move and/or reposition the side shields in order to facilitate a turn. Furthermore, most, if not all of the above systems, are not readily adaptable for use with a variety of tractor/tailer combinations without major alterations. This later point is very important in that it is commonly known that there are more trailers in service than there are tractors. It is very common for one tractor to be used with a number of different trailers. Therefore, the air deflector system must be readily adaptable to be used with a variety of different trailers.

SUMMARY OF THE INVENTION

The air deflection system of this invention is used with a drive vehicle coupled together in a tandem towing relationship with a trailer, such as a tractor-trailer combination. The air deflection system comprises a mounting frame which is attached to the frame of the drive vehicle and three air fairings: top and two sides. The fairing is movably attached to the mounting frame and has an outer surface which is adjacent to a portion of the top of the cab and which extends rearwardly toward the trailer. This aerodynamically blends the top portion of the top of the cab with the top of the trailer. The two side fairings are also movably attached to the mounting frame, one on each side of the drive vehicle. Each side fairing extends from the drive vehicle rearwardly towards the trailer and wherein the top portion of the side fairing mates with the top fairing. This results in the air deflection system being mounted independently from the cab of the drive vehicle.

This invention further provides for an air deflector system for aerodynamically reducing the drag on a vehicle having a tractor and trailer coupled together in a tandem towing relationship, by enclosing the space formed between the cab and the trailer. The air deflector system includes: a support means attached to the tractor frame; a top fairing attached to said support means and capable of movement from a closed portion to an extended portion, and two side fairings pivotally attached to said mounting frame for movement from a closed position to an extended position. The top fairing in the closed position extends from a top portion of the cab to overlap at its trailing edge with a top portion of the trailer to enclose the top of the space. The top fairing in its extended or open position has its trailing edge spaced a distance from the top of the trailer. The side fairings in their closed position extend from the tractor to overlap at their trailing edge a side portion of the trailer. Each side fairing has a top portion which mates with the top fairing when each is in its closed position. When the side fairing are in their extended or open position the trailing edge of the side fairing is positioned away from the side of the trailer.

Furthermore in accordance with the objects and other aspects and features of the present invention, there is disclosed a system for a towing vehicle-trailer combination comprising: (a) a support frame mounted on a frame portion of the towing vehicle, (b) a complementary pair of side fairings pivotally mounted on the support frame, (c) a top airfoil pivotally and slidably mounted on the support frame, and (d) an active means for independently articulating the fairings and airfoil responsive to a change in relative position between the towing vehicle and the trailer.

There is also disclosed a sensing system to determine the relative position between the towing vehicle and the trailer. There is also disclosed a control system responsive to the sensing system to independently actuate the fairings.

DESCRIPTION OF THE DRAWINGS

The following is a brief description of the drawings in which like parts bear like reference numerals and in which.

DESCRIPTION OF THE INVENTION

Figure 1:
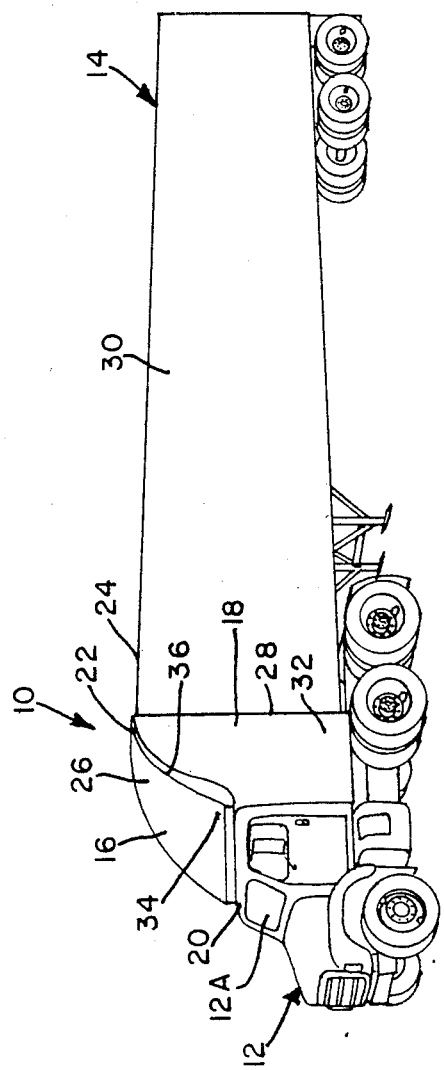
FIG. 1 is a side perspective view of a tractor/trailer combination having one embodiment of the air deflector system attached.
Figure 2:
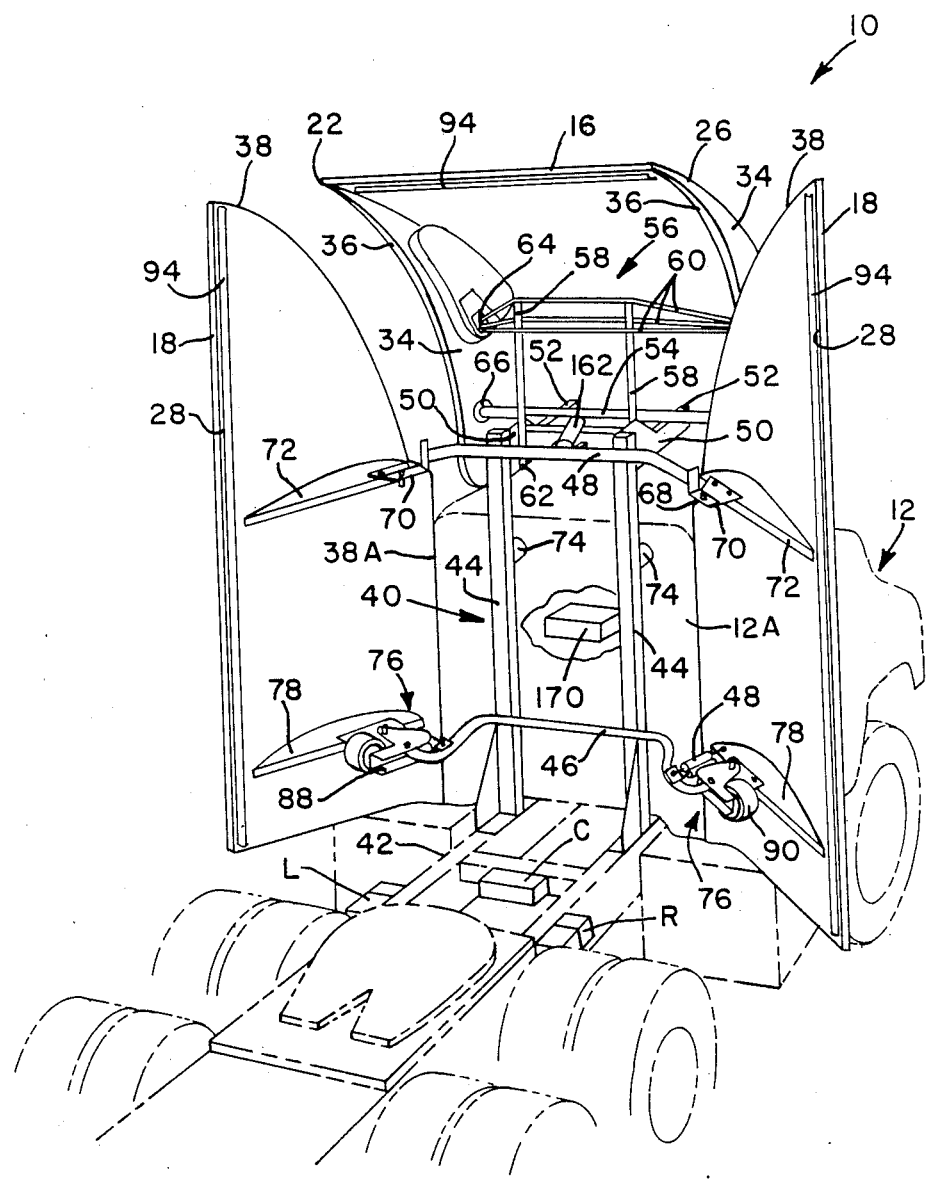
FIG. 2 is a rear perspective view of the air deflecting system attached to the tractor as viewed from the rear of the tractor.

Referring now more particularly to the drawings, an air deflector system embodying the principles of the present invention is shown generally in FIGS. 1 and 2 as reference numeral 10. The air deflector system is shown as mounted on a typical tractor-trailer truck combination wherein a tractor 12 is coupled together in tandem towing relationship with the trailer 14. The tractor 12 being the drive unit which provides the means for driving the trailer 14. The tractor 12 is shown as a conventional tractor having a cab 12A. However, the tractor could alternately be a conventional sleeper, a cab-over-engine configuration or a cab-over-engine sleeper configuration.

The air deflector system 10 has three air fairings, a top 16 and two side fairings 18 which provide for aerodynamically blending the air around the tractor-trailer. The top air fairing 16 extends from a top portion 20 of the tractor 12 rearwardly to overlap at the trailing edge 22 the top portion 24 of the trailer 14. The top portion aerodynamically blends the top portion 20 of the tractor 12 with the top portion 24 of the trailer 14 by means of a curved outer surface 26.

The side fairings 18 each spaced from the rear of the cab 12A extend rearwardly to overlap at their trailing edge 28 a portion of the side 30 of the trailer. The side portions aerodynamically blend the sides of the tractor to the sides of the trailer. This is partially accomplished by means of a curved outer surface 32.

The top fairing 16 mates with each side fairing 18. This provides for a more effective sealing of the gap between the tractor and trailer. The top fairing 16 has two diametrically opposed side portions 34 each having a contoured or curved lower edge 36 which mates with corresponding contoured or curved outer edge 38 of a top portion of the side fairings 18. Preferably, the top fairing overlaps the top portion of the side fairing to provide a better sealing of the fairings, thereby reducing the possibility of air entering into the enclosed space between the cab and trailer.

Figure 3:
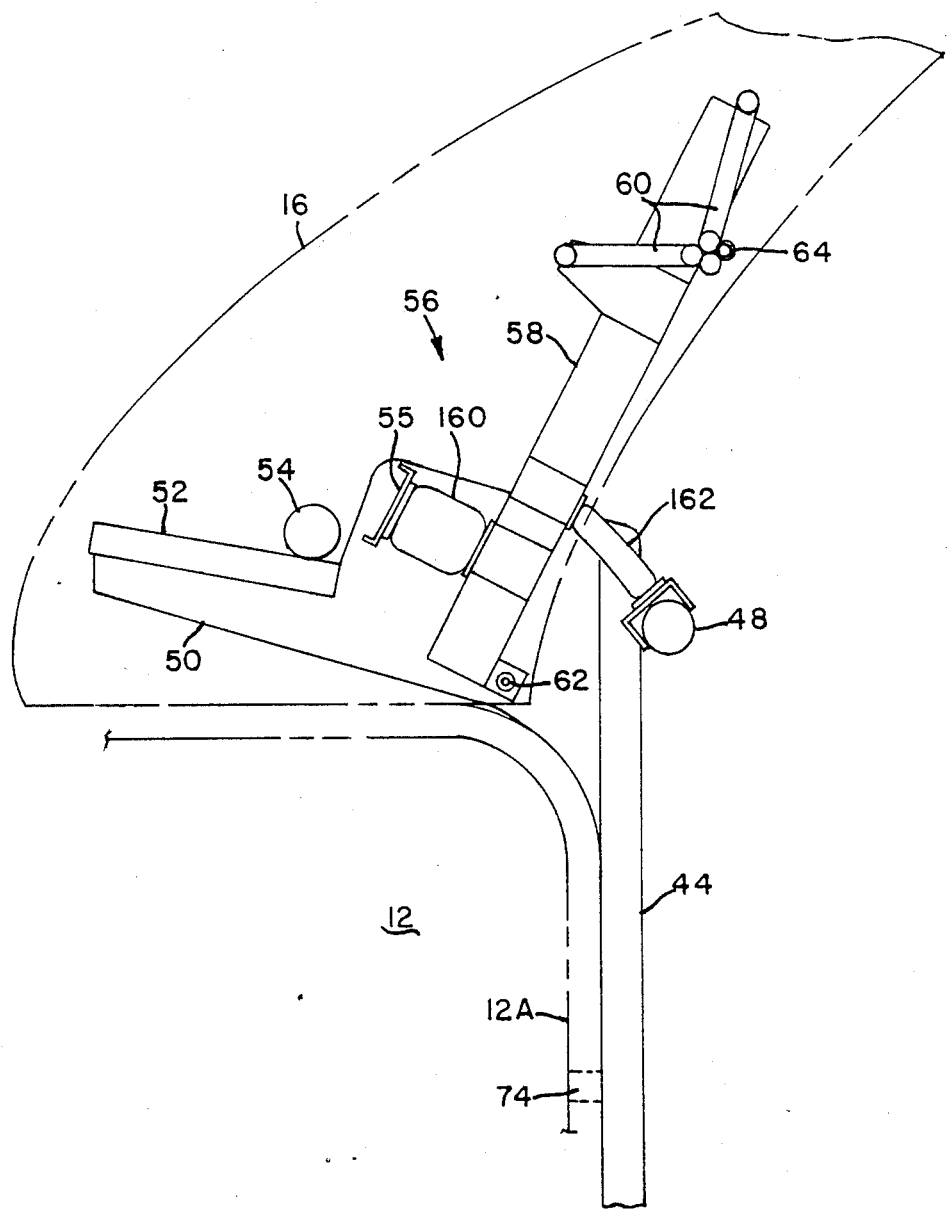
FIG. 3 is a side view of a portion of the fairing actuation mechanism.

Now referring more particularly to FIGS. 2 and 3 the top 16 and side 18 air fairings are mounted to the tractor by attaching to a support structure shown generally at 40. The support structure in turn is carried by or attached to the frame 42 of the tractor.

The support structure 40 is comprised of uprights 44 to which are attached a bottom cross member 46, a top cross member 48 and forward support brackets or arms 50, each having a slide portion 52 for supporting a slide bar 54. At the outer ends of top cross member 48 are top hinge pins 68 which pivotally support top hinge brackets 70 which are connected to the top ribs 72 of each side fairing 18.

An attachment means, shown generally at 56, is attached to the support structure 40 for movably attaching the top air fairing 16 to the support structure. The attachment means comprises pivot arms 58 and T-bars 60. Pivot arms 58 are pivotally mounted on the forward support brackets 50 at arm pivots 62. T-bars 60 are connected to pivot arms 58 to pivotally support the top air fairing 16 at pivot points 64. Thus, upon actuation the top air fairing 16 pivots about the pivot points 64. In order to reduce the overall height required to pivot the top air fairing the attachment means may also include a slide bar 54. The slide bar is supported by the slide portion 52 of the forward support brackets 50 and attaches to the top air fairing at 66. In this manner upon actuation the attachment means allows the top air fairing 16 to both be pivotally and slidably moved. The top fairing 16 is pivoted about at 62 and slides along the slide portion 52.

Attached between the pivot arms 58, the forward support brackets 50, and cross member 55 is a pair of rear acting air springs 160 (only one of which is shown)

for retaining the top fairing in the closed position. A forward acting air spring 162 is attached to the pivot arms 58 and top cross member 48. Upon actuation the rear acting air springs 160 are de-energized and the forward acting air spring 162 is energized to allow the top air fairing 16 and slide bar 54 to slide along the slide portion and to also pivot about the pivot points 64.

The airsprings that have been used here and elsewhere herein are those of the type 1B5-520 as manufactured by The Goodyear Tire & Rubber Company although the invention is not specifically limited to just these types.

In order to prevent excessive forward/rear oscillation of the support structure 40, there is provide resilient mounts 74 connected between uprights 44 and the rear of the cab 12A. Such resilient mounts 74 allow for a normal amount of vibration of the mounting harness 44 without undue transmittal of that vibration to the cab 12.

Figure 4:
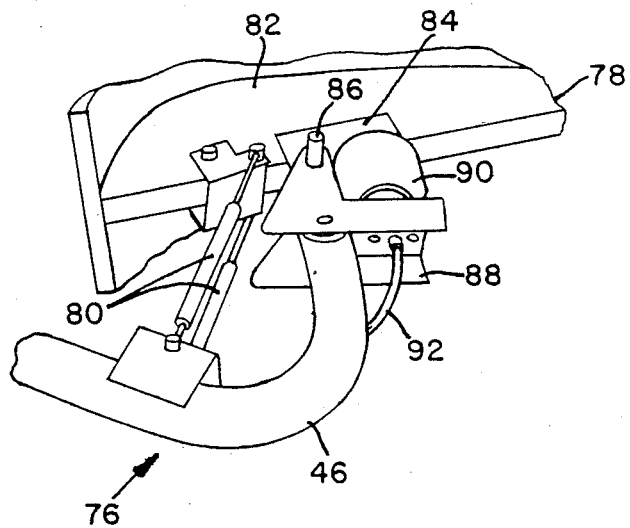
FIG. 4 is an enlarged view of the side fairing actuation mechanism.
Figure 5:
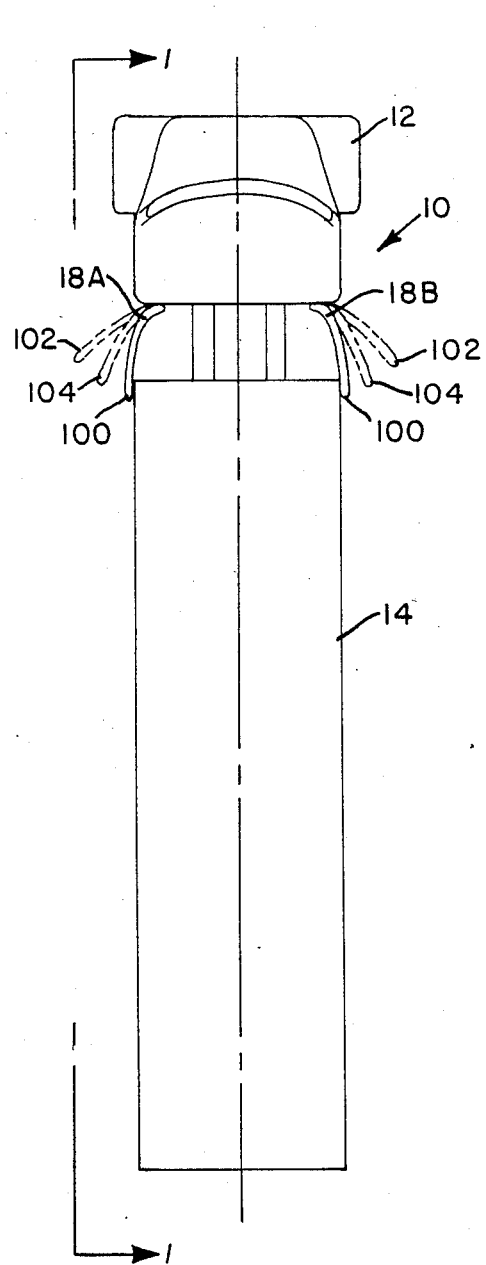
FIG. 5 is a top view of a tractor-trailer of Figure with the top air fairing removed.

The side fairing actuation mechanism, shown generally at 76, is more clearly illustrated in the enlarged view in FIG. 4 which illustrates the right side fairing actuation mechanism, it being understood that this is also applicable to the left side actuation mechanism.

The bottom rib 78 is attached to a bottom hinge bracket 84 which is pivotally mounted on bottom hinge pin 86. Between bottom hinge bracket 84 and backplate 88, which is rigidly mounted to bottom cross member 46, is an air spring 90, which is connected to an air line 92. Attached between the bottom cross member 46 and the bottom rib 78 of the right side fairing are gas springs 80 which serve to maintain a constant outward pressure against a forward portion of the side fairing 98. The side fairing pivots about the hinge pin 86 forcing the rear portion of the right side fairing against the side of the trailer 30. The air spring 90 upon actuation overcomes the outward pressure of the gas springs. This forces the forward portion of the side fairing 98 inwardly which in turn causes the fairing to pivot about the hinge pin 86 forcing the rear portion away from the side of the trailer. With the air springs de-actuated the springs 80 will force the side fairing to return to its closed position against the trailer.

Now referring again to FIG. 2, it can be appreciated from the foregoing description that because the support structure 40 is attached directly to the towing vehicle frame 42, that there is no need for a change of the cab suspension or reinforcement of the cab. Therefore, the present invention eliminates the problem of attaching the fairing system directly to the cab of the towing vehicle.

The side fairings 18 of the present invention have been aerodynamically designed to provide low wind resistance. The outer edge 38 at the forward edges 38A of the side fairings has been tapered and curved to reduce the weight of the side fairings as well as reducing the force moments being applied to the top cross member 48 and the bottom cross member 46. In addition, the location of the pivot point as illustrated in FIG. 4 is to balance the dynamic forces being exerted on the aerodynamically shaped outer surface of the fairing in order to minimize the forces that need be applied by the gas springs 80 and the fairing air springs 90.

In the same manner, the pivot points 64 on the top airfoil 16 which connect the top airfoil 16 to the T-bars 60, are selected to reduce torsional loadings due to aerodynamics and to balance the dynamic forces being exerted on the aerodynamically shaped outer surface.

The rigid connections 66 which connect the top airfoil 16 to slide bar 54 have been located to balance the aerodynamic forces acting upon the top airfoil 16, which provides a lifting force of the rear edge of top airfoil 16 against the weight of the top airfoil 16. The airfoil 16 of the present invention has a curved rear edge 36 which mates or complements the outer edge 38 of the side fairings 18.

As will be noted, the side fairing actuation mechanisms 76 are located near the bottom ends of the side fairings. Such a location is beneficial from the standpoint that when the fairings are in the closed position, having their rear edges in contact with the trailer 30, the top portions of the fairings 18 are capable of absorbing the side-to-side sway forces being exerted by the side-to-side swaying of the trailer as commonly occurs.

The particular actuation as described for the top airfoil 16 in contrast to the pivoting at the forward edge has been common in the prior art, minimizes the overall height of the system 10 during the periods of actuation, yet allows a clearance between the top air fairing 16 and possible overhead structures such as bridges, wires, etc. In addition, such actuation provides for the necessary clearance for the movement of the side clearings in their various modes.

Frame mounting of the system allows for a simpler attachment to a variety of tractors while allowing the torsional, wind, etc., forces generated to be transferred directly to the tractor frame. This allows the cab suspension to work independently of the air deflector system and thus does not require additional reinforcement.

By closing the top of the air space the total aerodynamic drag at highway speeds is reduced while generating a forward thrust. This also creates an upward lift which reduces the overall weight of the tractor-trailer combination. For example, lift of about 800 lbs can be created at about 60 MPH.

The aerodynamically contoured shape of the side fairings provide a forward thrust at highway speeds similar to the top fairing. The side fairings, by also balancing the aerodynamical forces, minimize the torsional moments, thus allowing for a lighter supporting structure and a reduction in actuation forces.

Each air fairing has a smooth, rigid, aerodynamic shape which in the normal closed position overlaps the trailer. A soft rubber cushion 94 applied to each trailing edge 22,28 of the air fairings 16,18 provides a means of preventing damage to the air fairings and/or the trailer. The thickness of the cushion 94 and the overall thickness of the overlap should be as minimal as possible. This is because additional thickness provides additional drag to the vehicle by increasing the overall frontal area of the vehicle. Fairings have been used wherein this cushion 94 has been about ⅜ of an inch to about ½ of an inch thick.

The operation of the air deflecting system is best illustrated by FIGS. 5 through 10. In FIGS. 5–7 and 9 the top air fairing has been removed to more clearly illustrate the operation of the side fairings.

With the tractor 12 and trailer 14 substantially in alignment with each other, i.e. both are traveling straight ahead, the top and side fairings are closed or unactuated. Each side fairing, left 18A and right 18B is capable of being actuated from a closed position 100 to a full open or extended position 102 or to an intermediate position 104. The operation of the air deflector system will now be discussed for a left handed turn, it being understood that the procedure would be similar for a right handed turn.

Figure 6:
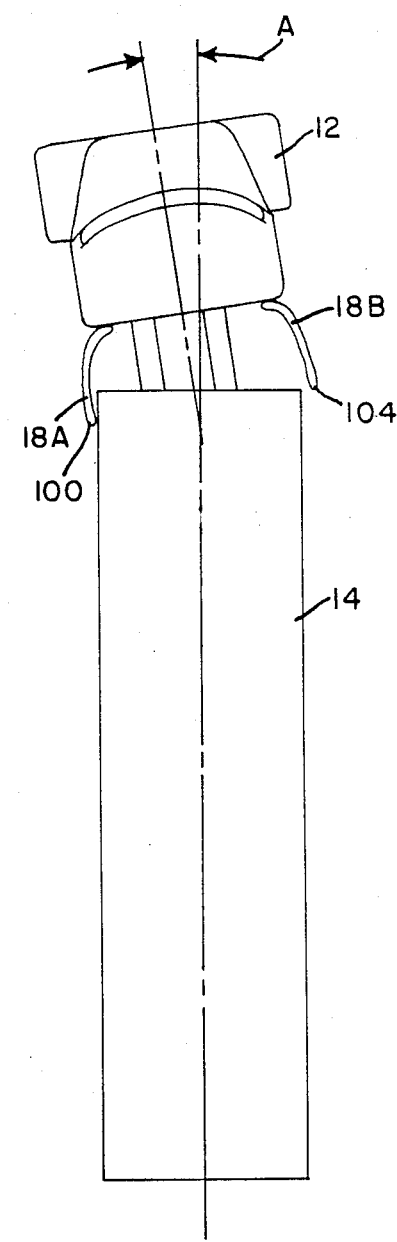
FIGS. 6, 7 and 9 are top views of the tractor-trailer during a left handed turn, the top fairing having been removed to more clearly illustrate the operation of the side fairings.

As the tractor 12 begins its turn, as illustrated in FIG. 6, a difference in alignment "A" between the tractor and the trailer exists. As this alignment difference "A" reaches a predetermined value, for example about 4°, the top fairing will open and the fairing on the outboard side of the turn, in this case the right fairing 18B, will open to a first or intermediate position 104. The angle "A" is the relative position of the centerline of the trailer to the centerline of the towing vehicle frame. It is to be appreciated that while certain values of the angle "A" are being set forth herein, certain modifications could be made in view of the present invention, which would change these values while still being within the scope of the present invention. This allows the tractor-trailer to turn freely without having to overcome the inward biasing or force to retain the side fairing against the trailer. The side fairing 18B only has to open enough to remain clear of the tractor, for example this could be about 6 inches (15 cm) to about 12 inches (30.5 cm). The inside fairing 18A remains in its unactuated or closed position.

Figure 7:
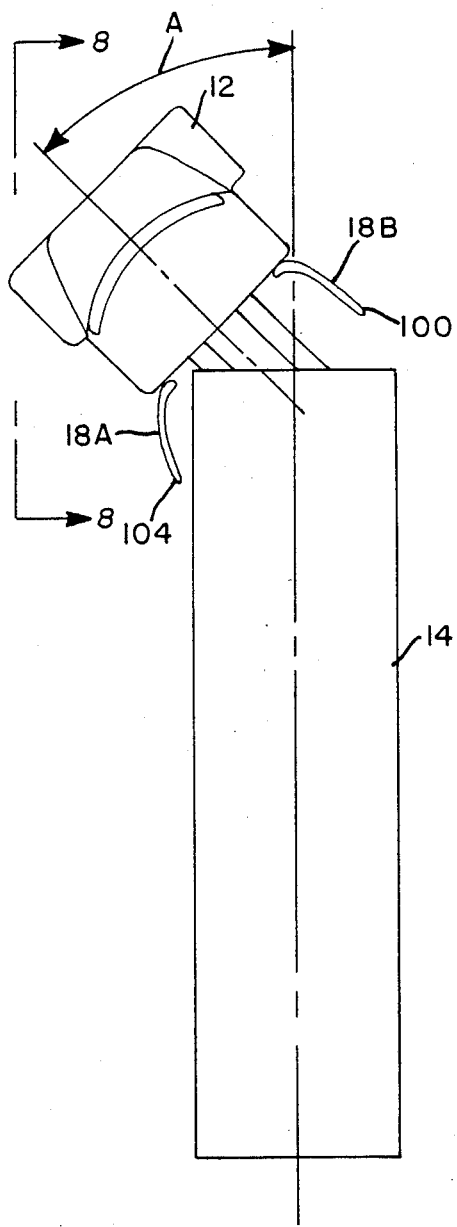
Figure 8:
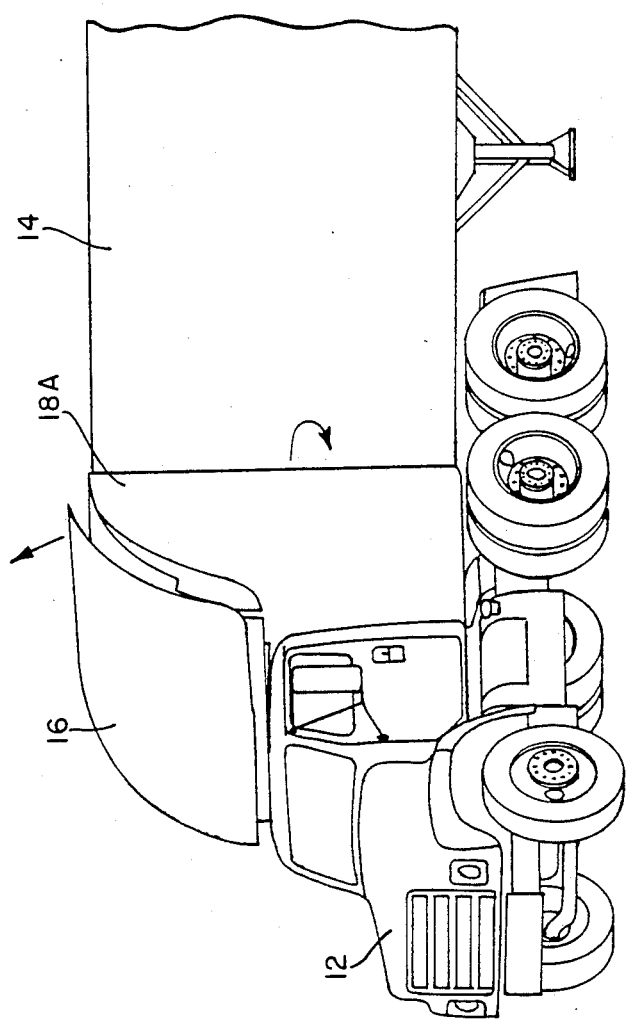
FIG. 8 is a partial side perspective view of the tractor-trailer and the air deflector system during a left handed turn.

If the tractor 12 continues its turn, as illustrated in FIGS. 7 and 8 the difference in alignment "A" between the tractor 12 and the trailer 14 reaches another predetermined value, for example from about 30° to about 50°, whereupon the inboard fairing, left fairing 18a, will be activated to the first or intermediate position 104 while the outboard fairing, right fairing 18b, will be inactivated to return to its closed position 100. It should be noted that although it is preferred to close the outboard fairing there may be instances where this is not practical. For example there may be items or protrusions on the leading edge of the tractor, such as refrigeration units, which could interfere with the outboard fairing if it were closed during the turn. In such cases it is preferred to keep the outboard fairing open during the turn.

Figure 9:
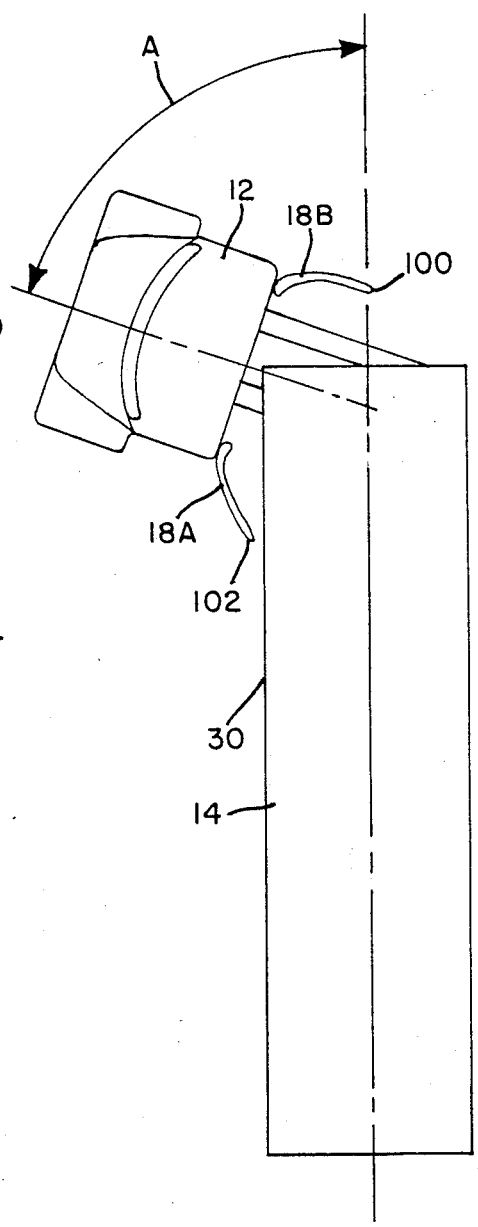

If the tractor 12 continues turning, as illustrated in FIG. 9, the difference in alignment "A" between the tractor 12 and the trailer 14 continues to increase until another predetermined value, for example about 60°, is reached. At that point the left fairing 18A would be extended to its full open position 102 such as about 28 inches (71 cm) which allows the tractor to continue through 90° plus turns. Depending upon the tractor-trailer combination involved the left fairing may in 90° plus turns come in contact with the side of the trailer. However, because of the mounting position of the gas spring which is substantially fully extended at this point the retention force on the fairings should not cause substantial binding and or impingement.

As the tractor-trailer comes out of the turn, the fairings will be actuated in reverse order. For example as the difference in alignment becomes less than 60°, the left fairing 18A will be moved to the intermediate portion 104 of FIG. 6. This will continue in sequence until the tractor-trailer is in alignment again and all the fairings are closed.

Figure 10:
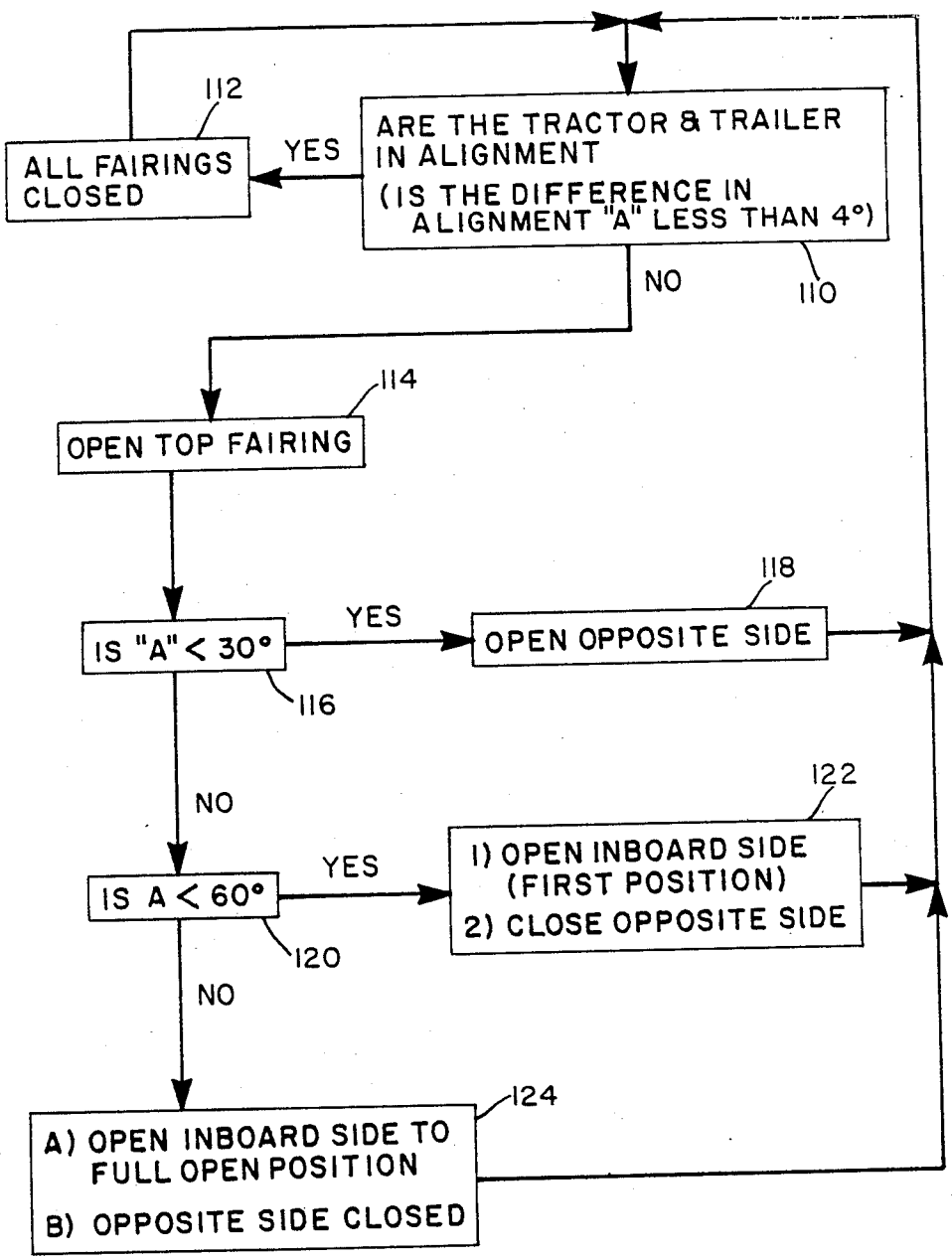
FIG. 10 is a block diagram of the operation of the fairings.

Referring to FIG. 10 there is illustrated a flow diagram representing the control logic for the actuation of the system. The means for controlling the air fairings could be microprocessor based logic, discrete components, hard wired relays, etc. The means for controlling the system would first determine if the tractor-trailer combination was in alignment with another 110. If they are then all the fairings are closed 112. If they are not then the top fairing is opened 114 (The top fairing staying open until the units are in alignment again). As long as the difference is less than about 30°, 116 the outboard fairing is opened 118. As the difference exceeds about 30° but is less than about 60°, 120 the inboard fairing is opened to the first position and the outboard fairing is closed 122 (except if the device will be used with refrigeration units, etc., as noted above). As the turn exceeds about 60°, the inboard fairing is extended to the full open position while the opposite fairing is closed 124.

The control system can determine the alignment between the tractor-trailer by input signals from a sensing means. The sensing means may be any sensor or combination thereof for detecting the change in relationship between the tractor and trailer. For example, this could be detected through the use of proximity sensors, limit switches or through proportional position sensors with variable outputs (such as potentiometers) having a connection between the tractor and the trailer. It is believed that proximity sensors or the like which would not require a connection between the tractor-trailer are more preferred. This is because the operators of the tractor-trailer prefer not to connect/disconnect the sensor from the trailer each time they connected/disconnected the tractor from the trailer units. Proximity sensors, mounted to the rear of the tractor provide a means for sensing the alignment between the units without requiring an attachment to the trailer.

While many different types of sensors are capable of detecting the proximity of or the absence of another object, such as infrared, magnetic, photoelectric, ultrasonic fiber-optic, electro-mechanical, etc., it is particularly preferred to use a system based on ultrasonic proximity sensors. The ultrasonic proximity sensors are preferred from the standpoint of being resistant to atmospheric conditions, such as dirt and water contamination. One type of ultrasonic sensor which can be used in connection with this invention is available from Migatron, Inc., LaGrange, Ill., under the trade name, Model RPS-300.

Figure 11:
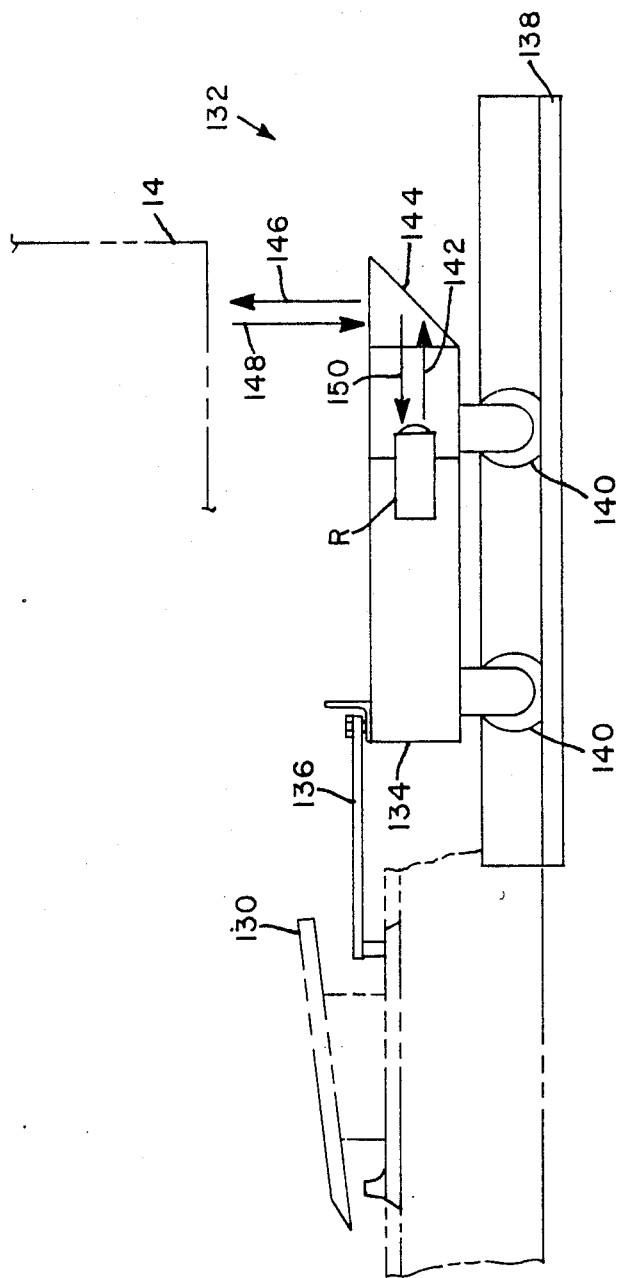
FIG. 11 is an enlarged side view of an adjustable proximity sensor system embodied in the present invention.
Figure 12:
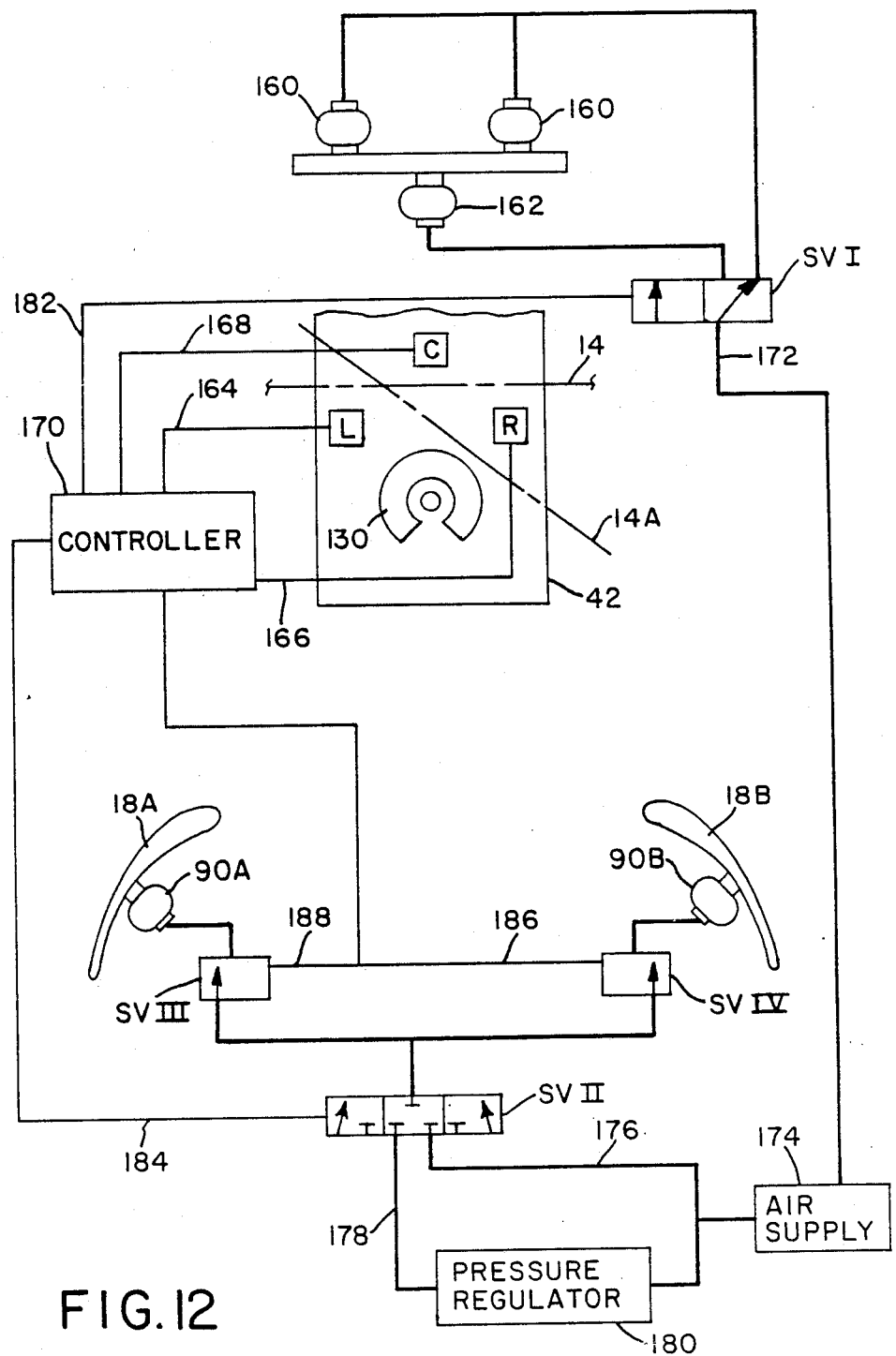
FIG. 12 is a schematic control diagram.

Referring again to FIG. 2, the sensing means may comprise three proximity sensors, center proximity sensor C, left proximity sensor L and right proximity sensor R. The center proximity sensor C is mounted to the frame of the tractor 12 at a point which is located approximately along the centerline of the unit and which will be forward of the leading or front edge of the trailer when attached to the tractor. Left and right proximity sensors may be attached on either side of the tractor frame 42 and rearwardly of the forward edge of trailer 14. Referring to FIG. 10, in those types of towing vehicles having fixed fifth wheels 130 the left and right proximity sensors are generally mounted directly to the towing vehicle frame 42. In vehicles having fifth wheels 130 which are adjustable forwardly or rearwardly along towing the vehicle frame 42, there is provided an adjustable proximity sensor apparatus as illustrated generally at 132 in FIG. 11. The adjustable proximity sensor apparatus 132 has the sensor housing 134 supporting the proximity sensors L and R, of which only R is shown, connected to the fifth wheel 130 by connecting rod 136 to provide for the movement of sensor housing 134 in track 138 by means of rollers 140. This movement of the sensors R and L in relation to the fifth wheel 130 maintains the location of the sensors R and L at a point to the rear of the forward edge of the trailer 14.

The right proximity sensor R transmits an ultrasonic signal 142 which is deflected off signal deflector 144 which is an end portion of sensor housing 134 arranged at a 45° angle to both the horizontal and the vertical. The deflected signal 146 is then transmitted upwardly to the trailer 14. The presence of trailer 14 will reflect a signal 148 back down to signal deflector 144 and then back 150 to the proximity sensor R. The left L proximity sensor and the center proximity sensor C, located in front of the front edge of trailer 14, operate in a similar manner.

Referring now to FIGS. 5–9 and 12, each sensor L, R, C transmits a signal 164,166,168 to a controller (microprocessor based, hard wired, etc.) 170, indicating the presence or lack thereof of the trailer 14. The controller 170, based upon the received signals, will then actuate the opening or closing of the appropriate fairing(s). With the tractor-trailer in alignment both the L and R proximity sensors indicate the presence of the trailer 14 while the center proximity sensor C, located forward of the leading edge of the trailer 14 does not. Therefore the top air fairing is in the rear or closed position with the rear acting air springs 160 actuated to keep the top air fairing in the closed position. Both the left and right side fairing air springs 90A,90B are also inactivated which thereby allows the side fairings to be in the closed position 100 against the sides of the trailer.

SVI is the top airfoil control solenoid valve which is a double actuating solenoid valve which allows pressurized air 172 from air supply 174 to be sent either to the forward acting air spring 162 or to the rear acting air springs 160 which serve pivotally and slidably the top airfoil in a forward position or in a rearward position. SVII is the side fairing pressure level control solenoid valve, which also is a double acting solenoid valve to allow either a high air pressure 176 to go directly from the air supply 174 to the side fairing air springs 90a, 90b or a reduced air pressure 178 from a pressure regulator 180 to go to the side fairing air springs. SVIII and SVIV are the left and right side fairing control valves.

As the tractor-trailer begins to make a left turn, the right proximity sensor R loses sight of the trailer 14A while the left proximity sensor L still detects its presence. In such a situation, the controller 170 actuates 182 the top airfoil solenoid valve which diverts the pressure from the air supply from the rear acting air springs 160 to the forward acting air spring 162, thus moving the top airfoil to its forward position. Simultaneously signals 184 and 186 are sent to SVII and SVIV respectively to allow low air pressure to enter the right side fairing air spring 90b. This opens the right side fairing 18b to a first position 104 to enable the fairing to clear the forward right corner of the trailer. As the angle A increases to approximately 30°, the left forward edge of the trailer becomes detected by center proximity sensor C. The controller then switches the actuation 188 of the solenoid valves from the right SVIV to the left SVIII. This closes the right side fairing and opens the left side fairing to its first open position 104.

A further continuation in the turn results in the right proximity sensor R redetecting the presence of the trailer. This combination of signals actuates side fairing pressure level control solenoid valve SVII to allow full pressure to be applied to the left side fairing air spring 90a, thus opening it to its full open position 102, and preventing the rear edge of the left side fairing from coming in contact with the side of the trailer.

The operation of the system for the making of right hand turns is identical to that of making left hand turns with the exception that the roles of the two side fairing control solenoid valves are reversed. It should be noted that at an angle A of 60° in both the right hand turn and the left hand turn, the role of the sensors are identical. For this reason it is necessary to include in the controller 170 a means, such as a storage memory which remembers the sequence of sensor changes in order to assure that the correct side fairing operation. It has also been found beneficial to include a time delay, in order to allow for the side fairings 18a and 18b to come to the full closed position prior to the top airfoil being closed.

While certain representative embodiments and details have been shown for the purpose of illustrating the invention, it will be apparent to those skilled in this art that various changes and modifications may be made therein without departing from the scope of the invention.

It is claimed:

1. An air deflector system for use with a drive vehicle coupled together in tandem towing relationship with a trailer, the drive vehicle having a frame and a cab portion mounted upon said frame, said air deflector system comprising:
   (a) a mounting frame attached to the frame of the drive vehicle;
   (b) a top fairing movably attached to said mounting means having an outer surface adjacent to a top portion of the cab and extending rearwardly toward said trailer for aerodynamically blending the top portion of the cab with a top portion of the trailer;
   (c) two side fairings movably attached to said mounting frame, one on each side of the drive vehicle, each extending from the drive vehicle rearwardly towards the trailer and having a top portion which mates with the top fairing; and wherein said top and side fairings move during the operation of the vehicle.

2. The air deflector system of claim 1 further comprised by a means for moving said top and side fairings from one portion to another.

3. The air deflector system of claim 2 wherein said means comprises:
   a sensing means for determining the alignment between the drive vehicle and the trailer; and
   an actuation means coupled to said fairings for actuating said fairings from one position to another position in response to said alignment.

4. The air deflector system of claim 3 wherein each said fairing is pivotally attached to said mounting frame.

5. The air deflector system of claim 4 wherein said top fairing is both pivotally and slidably attached to said mounting frame.

6. The air deflector system of claim 5 wherein said side fairings are pivotally attached to said mounting frame at a point wherein at a normally closed position the outward aerodynamic resulting forces acting on said side fairings are substantially balanced.

7. The air deflector system of claim 5 wherein the top fairing overlaps a top portion of the trailer, each side fairing overlaps a side of said trailer, and said top fairing overlaps and interlocks with each said side fairing; and wherein in response to said sensing means said actuation means raises said top fairing to a first position and extends at least one said side fairings outwardly from said drive vehicle.

8. An air deflector system for aerodynamically reducing the drag on a vehicle having a tractor and trailer coupled together in a tandem towing relationship, said tractor having a frame and a cab portion mounted there upon and said trailer spaced a predetermined distance from said cab, forming a space therebetween, said air deflector system comprising:

a support means attached to the tractor frame;

a top fairing attached to said support means and capable of movement from a closed position to an extended position, said fairing in said closed position extending from a top portion of the cab to overlap at a trailing edge with a top portion of the trailer to enclose the top of said space and in said extended position the trailing edge is spaced from the top of the trailer a predetermined distance;

two side fairings movably attached to said mounting means for movement from a closed position to an extended position with one on each side of the tractor and each in said closed position extending from the tractor to overlap at a trailing edge a side portion of the trailer, each side fairing having a top portion which mates with the top fairing when said top and side fairings are all in said closed position and in an extended position the side fairing is pivoted to position the trailing edge of the side fairing away from the side of the trailer a predetermined distance; and whereas with each fairing in the closed position the space between said tractor and trailer is substantially enclosed.

9. The system of claim 8 further comprising:
(a) a means for sensing the alignment between the tractor and the trailer; and
(b) a means for moving the fairings from one position to another; and
(c) a means coupled to the means of (a) and (b) for controlling the movements of the fairings from one position to another.

10. The system of claim 9 wherein said top fairing has a curved top portion and two diametrically opposed curved side portions each having a contoured lower edge for mating in overlapping relationship with a contoured outer edge of said top portion of said side fairings.

11. The system of claim 10 further comprising an attachment means for pivotally and slidably attaching said top fairing to said support means, and wherein said side fairings are pivotally attached to said support means.

12. The system of claim 11 wherein said means for moving said fairings includes
three driving means, one for each fairing, for driving said fairings from said closed position to said extended position upon actuation by said control means;
three biasing means, one for each fairing for returning the fairings to said closed position.

13. The system of claim 14 wherein said driving means comprises an air spring.

14. The system of claim 13 wherein at least one said biasing means comprises two air springs and at least one other biasing means comprises springs.

15. The system of claim 9 wherein said means for sensing the alignment between the tractor and the trailer comprises three proximity sensors.

16. The system of claim 15 wherein each said proximity sensor is carried by said tractor, first and second said proximity sensors attached on either side of the tractor and rearwardly of the forward edge of the trailer, when said tractor/trailer is substantially in alignment, and third said proximity sensor located at a point which is substantially along the centerline of the tractor and which is forward of a leading edge of the trailer when said tractor/trailer is substantially in alignment.

17. The system of claim 16 wherein said first and second proximity sensors are movably attached to said tractor.

18. The system of claim 17 wherein said first and second proximity sensors are carried by a housing having rollers and attached to a fifth wheel of said tractor by as connecting rod to provide for the movement of said housing in a track.

19. The method of aerodynamically reducing the drag on a vehicle having a tractor having a frame and a cab mounted thereupon, and trailer coupled together in a towing relationship comprising the steps of
(a) deflecting oncoming air by means of a top and a first and second side fairing; said top and side fairings, when in a closed position, enclosing a space between the cab and the trailer, each said fairing movably attached to a support means which is attached to the frame of the tractor;
(b) determining when the tractor-trailer is turning; and
(c) actuating the top air fairing to an open position and actuating the first side fairing to a first open position at a predetermined point or degree in said turn.

20. The method of claim 19 further comprising the step of opening the second side fairing to a first open position and closing the first side fairing as the degree of the turn reaches a second predetermined point.

21. The method of claim 20 further comprising the step of opening the second side fairing to a full open position as the turn reaches a third predetermined point.

22. The method of claim 20 further comprising the step of opening the second side fairing to a first open position as the degree of the turn reaches a second predetermined point.

23. The method of claim 21 further comprising the step of opening the second side fairing to a full open position as the turn reaches a third predetermined point.

24. The method of claim 23 wherein said step of determining when the tractor-trailer is turning comprises determining the alignment between said tractor-trailer.

25. The method of claim 24 wherein the step of determining the alignment comprises
a plurality of proximity sensors, each transmitting a first signal for determining the absence or presence of the trailer; and
each proximity sensor transmitting a second signal to a control means, said second signals indicating the presence or absence of the trailer.

26. The method of claim 24 wherein said fairings are actuated by air springs.

27. The method of aerodynamically reducing the drag on a vehicle having a tractor and a trailer coupled together in a towing relationship comprising the steps of
(a) deflecting oncoming air from the tractor by an air deflecting means;
(b) sensing the relative position of the trailer to the tractor by a sensing means;
(c) transmitting signals from the sensing means to a control means;
(d) determining when a difference in alignment between said tractor-trailer exists by said control means;
(e) actuating the air deflecting means from one position to another position when said difference in alignment reaches a predetermined value.

* * * * *